US012183246B2

(12) United States Patent
Zhang

(10) Patent No.: US 12,183,246 B2
(45) Date of Patent: Dec. 31, 2024

(54) DISPLAY PANEL DRIVING METHOD AND APPARATUS, ELECTRONIC DEVICE, AND STORAGE MEDIUM

(71) Applicant: GUANGZHOU CHINA STAR OPTOELECTRONICS SEMICONDUCTOR DISPLAY TECHNOLOGY CO., LTD., Guangzhou (CN)

(72) Inventor: Yi Zhang, Guangzhou (CN)

(73) Assignee: GUANGZHOU CHINA STAR OPTOELECTRONICS SEMICONDUCTOR DISPLAY TECHNOLOGY CO., LTD., Guangzhou (CN)

( * ) Notice: Subject to any disclaimer, the term of this patent is extended or adjusted under 35 U.S.C. 154(b) by 0 days.

(21) Appl. No.: 18/384,589

(22) Filed: Oct. 27, 2023

(65) Prior Publication Data

US 2024/0221579 A1 Jul. 4, 2024

(30) Foreign Application Priority Data

Dec. 29, 2022 (CN) ........................ 202211711966.7

(51) Int. Cl.
*G09G 3/20* (2006.01)

(52) U.S. Cl.
CPC ......... *G09G 3/2022* (2013.01); *G09G 3/2011* (2013.01); *G09G 3/2025* (2013.01); *G09G 3/2081* (2013.01); *G09G 2310/0245* (2013.01); *G09G 2320/0233* (2013.01); *G09G 2320/0626* (2013.01)

(58) Field of Classification Search
CPC .. G09G 3/2022; G09G 3/2011; G09G 3/2025; G09G 3/2081; G09G 2310/0245; G09G 2320/0233; G09G 2320/0626
USPC .......................................................... 345/690
See application file for complete search history.

(56) References Cited

U.S. PATENT DOCUMENTS

2003/0058195 A1* 3/2003 Adachi .................... G09G 3/20 345/67
2006/0262054 A1* 11/2006 Yamazaki ................ G09G 3/20 345/77
2007/0103427 A1* 5/2007 Zhou ...................... G09G 3/344 345/107

(Continued)

*Primary Examiner* — Tom V Sheng
(74) *Attorney, Agent, or Firm* — The Roy Gross Law Firm, LLC; Roy Gross

(57) ABSTRACT

The embodiments of the present application provide a display panel driving method and apparatus, an electronic device, and a storage medium. The display panel driving method includes: obtaining a set of driving voltages for driving the display panel, where the set of driving voltages includes driving voltages having different magnitudes; determining a target gray scale corresponding to a target pixel unit of a picture to be displayed; determining one target driving voltage corresponding to the target pixel unit from the set of driving voltages according to the target gray scale; determining at least one target sub-frame for driving the target pixel unit from the plurality of sub-frames according to the target gray scale; and driving the target pixel unit with the target driving voltage for a time period corresponding to the target sub-frame, so that the target pixel unit reaches brightness corresponding to the target gray scale.

14 Claims, 3 Drawing Sheets

(56) References Cited

U.S. PATENT DOCUMENTS

| | | | | |
|---|---|---|---|---|
| 2007/0146561 | A1* | 6/2007 | Zhou | G09G 3/344<br>349/2 |
| 2010/0033507 | A1* | 2/2010 | Huang | G09G 3/36<br>345/690 |
| 2012/0119981 | A2* | 5/2012 | Shiomi | G09G 3/3648<br>348/731 |
| 2014/0218421 | A1* | 8/2014 | Lee | G09G 3/3208<br>345/77 |
| 2017/0330521 | A1* | 11/2017 | Zhao | G09G 3/3688 |
| 2021/0065655 | A1* | 3/2021 | Zhai | G09G 5/10 |
| 2023/0343268 | A1* | 10/2023 | Cheng | G09G 3/2007 |

* cited by examiner

DISPLAY PANEL DRIVING METHOD AND APPARATUS, ELECTRONIC DEVICE, AND STORAGE MEDIUM

CROSS-REFERENCE TO RELATED APPLICATION

This application claims priority to and the benefit of Chinese Patent Application No. 202211711966.7, filed on Dec. 29, 2022, the entire content of which is hereby incorporated by reference.

TECHNICAL FIELD

The present application relates to the field of display technologies, and more particularly to a display panel driving method and apparatus, an electronic device, and a storage medium.

BACKGROUND

Direct display products with glass-based MLED may have a wide range of applications in the areas of conference rooms, home cinemas, pavilions, and outdoor displays due to their advantages such as high color gamut, high brightness, and infinity of splicing. However, an operating current is smaller upon driving of the glass-based MLED, especially for the DC-driven glass-based MLED. The DC-driven glass-based MLED may operate at only a few microamps or even lower at a low gray scale. However, light emission of a current LED at a low current is unstable, which results in uneven brightness of the LED of the DC-driven glass-based MLED at the low gray scale, presenting uneven brightness and "pockmark" from a macro perspective of the panel, affecting the display quality.

SUMMARY

In one aspect, an embodiment of the present application provides a method for driving a display panel, the display panel including a plurality of pixel units, and a frame of scanning time of the display panel including a plurality of sub-frames, where the method includes: obtaining a set of driving voltages for driving the display panel, where the set of driving voltages includes a plurality of driving voltages having different magnitudes; determining a target gray scale corresponding to a target pixel unit of a picture to be displayed; determining at least one target driving voltage corresponding to the target pixel unit from the set of driving voltages according to the target gray scale; determining at least one target sub-frame for driving the target pixel unit from the plurality of sub-frames according to the target gray scale; and driving the target pixel unit with the target driving voltage for a time period corresponding to the target sub-frame, so that the target pixel unit reaches brightness corresponding to the target gray scale.

In some possible embodiments, the obtaining of the set of driving voltages includes: obtaining the number of gray scales corresponding to a gray scale level in the display panel; determining the number of sub-frames of the plurality of sub-frames; obtaining a preset initial driving voltage for driving the display panel; and determining the set of driving voltage set for driving the display panel according to the number of gray scales, the number of sub-frame number, and the initial driving voltage.

In some possible embodiments, the method further includes: after determining of the target gray scale, determining whether a magnitude of the target gray scale is less than a preset gray scale threshold or not.

In some possible embodiments, the determining of the at least one target driving voltage includes: in response to determining that the magnitude of the target gray scale is less than the preset gray scale threshold, determining the target driving voltage corresponding to the target pixel unit from the set of driving voltages according to the target gray scale.

In some possible embodiments, the driving of the target pixel unit includes: driving the target pixel unit with one target driving voltage for a time period corresponding to the target sub-frame, so that the target pixel unit reaches brightness corresponding to the target gray scale, where, the target sub-frame includes one sub-frame.

In some possible embodiments, the determining of the at least one target driving voltage further includes: in response to determining that the magnitude of the target gray scale is greater than or equal to the preset gray scale threshold, determining a plurality of target driving voltages corresponding to the target pixel unit from the set of driving voltages according to the target gray scale, where, the plurality of target driving voltages are a plurality of driving voltages in the set of driving voltages of which magnitudes differ by a preset range.

In some possible embodiments, the driving of the target pixel unit includes: sorting a plurality of the target driving voltages in a descending order to obtain the sorted target driving voltages; and sequentially driving the target pixel unit with the sorted target driving voltages within a time period corresponding to the target sub-frame, so that the target pixel unit reaches brightness corresponding to the target gray level; where, the target sub-frame includes a plurality of sub-frames In another aspect, another embodiment of the present application provides an apparatus for driving a display panel, including: a voltage obtaining module for obtaining a set of driving voltages for driving the display panel, where the set of driving voltages includes a plurality of driving voltages having different magnitudes; a gray scale determining module for determining a target gray scale corresponding to a target pixel unit of a picture to be displayed; a voltage determining module for determining at least one target driving voltage corresponding to the target pixel unit from the set of driving voltages according to the target gray scale; a sub-frame determining module for determining at least one target sub-frame for driving the target pixel unit from the plurality of sub-frames according to the target gray scale; and a driving module for driving the target pixel unit with the target driving voltage for a time period corresponding to the target sub-frame, so that the target pixel unit reaches brightness corresponding to the target gray scale.

In yet another aspect, yet another embodiment of the present application further provides an electronic device, including: one or more processors; a memory; and one or more application programs, where the one or more application programs are stored in the memory and configured to be executed by the processors to implement any of the methods as described in the above aspects.

In yet other aspect, yet other embodiment of the present application further provides a computer readable storage medium having stored thereon a computer program that is loaded by a processor to perform any of the methods as described in the above aspects.

BRIEF DESCRIPTION OF THE DRAWINGS

In order to more clearly illustrate the technical solutions in embodiments of the present application, the accompanying drawings depicted in the description of the embodiments will be briefly described below. It will be apparent that the accompanying drawings in the following description are merely some embodiments of the present application, and other drawings may be obtained from these drawings without creative effort by those skilled in the art.

DETAILED DESCRIPTION

Figure 1:
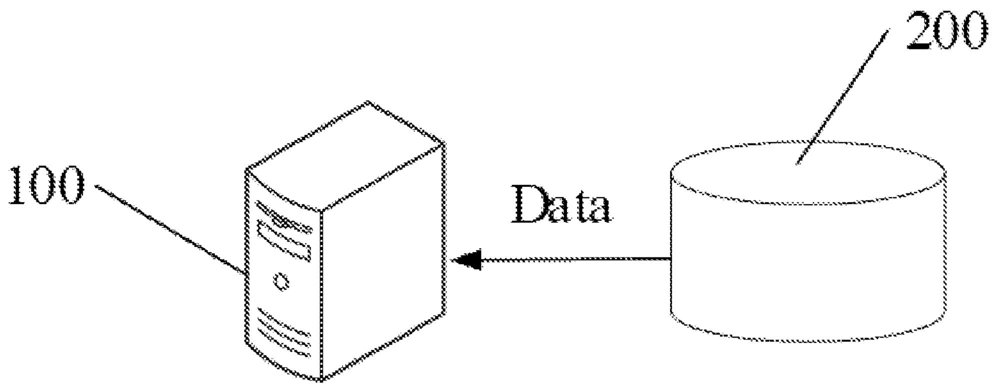
FIG. 1 is a schematic diagram of a scenario of a display panel driving system according to some embodiments of the present application.

Technical solutions in embodiments of the present application will be clearly and completely described below in conjunction with drawings in the embodiments of the present application. Obviously, the described embodiments are only a part of embodiments of the present application, rather than all the embodiments. Based on the embodiments in the present application, all other embodiments obtained by those skilled in the art without creative work fall within the protection scope of the present application.

In the description of the present application, it should be understood that orientations or position relationships indicated by the terms "center", "longitudinal", "lateral", "length", "width", "thickness", "upper", "lower", "front", "rear", "left", "right", "vertical", "horizontal", "top", "bottom", "inside", and "outside" are based on orientations or position relationships illustrated in the drawings. The terms are used to facilitate and simplify the description of the present application, rather than indicate or imply that the devices or elements referred to herein are required to have specific orientations or be constructed or operate in the specific orientations. Accordingly, the terms should not be construed as limiting the present application. In addition, the term "first", "second" are for illustrative purposes only and are not to be construed as indicating or imposing a relative importance or implicitly indicating the number of technical features indicated. Thus, a feature that limited by "first", "second" may expressly or implicitly include at least one of the features. In the description of the present application, the meaning of "plurality" is two or more, unless otherwise specifically defined.

In the present application, the word "exemplary" is used to mean "serving as an example, illustration, or explanation". Any embodiment described as "exemplary" in the present application is not necessarily construed as being more preferable or advantageous than other embodiments. In order to enable any person skilled in the art to implement and use the present application, the following description is given. In the following description, the details are listed for the purpose of explanation. It should be understood that those of ordinary skill in the art can realize that the present application can also be implemented without using these specific details. In other instances, well-known structures and processes will not be elaborated to avoid unnecessary details to obscure the description of the present application. Therefore, the present application is not intended to be limited to the illustrated embodiments, but is consistent with the widest scope that conforms to the principles and features disclosed in the embodiments of the present application.

It should be noted that the method according to the embodiment of the present application is executed in an electronic device, and processing objects of the electronic device exist in the form of data or information. For example, time substantially indicates time information. It can be understood that, in the subsequent embodiments, if a magnitude, number, position, or the like are mentioned, the data corresponding thereto exists for processing by the electronic device, and details thereof are not described herein.

Embodiments of the present application provide a display panel driving method and apparatus, an electronic device, and a storage medium, which are described in detail below.

Referring to FIG. 1, which is a schematic diagram of a scenario of a display panel driving system according to some embodiments of the present application. The display panel driving system may include an electronic device 100 in which the display panel driving apparatus is integrated, such as the electronic device shown in FIG. 1.

In the embodiments of the present application, the electronic device 100 may be a stand-alone server, or may be a server network or a server cluster composed of servers. For example, the electronic device 100 described in the embodiments of the present application includes, but is not limited to, a computer, a network host, a single network server, a plurality of network server clusters, or a cloud server composed of a plurality of servers. The cloud server is composed of a supercomputer based on cloud computing or a network server.

It should be understood by those skilled in the art that an application environment shown in FIG. 1 is merely an application scenario of the solution of the present application, and does not constitute a limitation on the application scenario of the solution of the present application. Other application environments may also include more or fewer electronic devices than those shown in FIG. 1. For example, one electronic device is shown in FIG. 1. It should be understood that the display panel driving system may also include one or more other servers, which is not specifically limited herein.

In addition, as shown in FIG. 1, the display panel driving system may further include a storage unit 200 for storing data, such as, one or more driving voltages.

It should be noted that the schematic diagram of the scenario of the display panel driving system shown in FIG. 1 is merely an example. The display panel driving system and scenario described in the embodiments of the present application are intended to more clearly illustrate the technical solution of the embodiments of the present application, and do not constitute a limitation on the technical solution provided in the embodiments of the present application. It will be appreciated by a person skilled in the art that the technical solution provided in the embodiments of the present application is also applicable to similar technical problems with the evolution of the display panel driving system and the emergence of a new service scenario.

The embodiments of the present application provide a display panel driving method, which is executed by a display panel driving apparatus applied to an electronic device. The display panel includes a plurality of pixel units, and a frame of scanning time of the display panel includes a plurality of sub-frames, where the method includes: obtaining a set of driving voltages for driving the display panel, where the set of driving voltages includes a plurality of driving voltages having different magnitudes; determining a target gray scale corresponding to a target pixel unit of a picture to be displayed; determining at least one target driving voltage corresponding to the target pixel unit from the set of driving voltages according to the target gray scale; determining at least one target sub-frame for driving the target pixel unit from the plurality of sub-frames according to the target gray scale; and driving the target pixel unit with the target driving voltage for a time period corresponding to the target sub-frame, so that the target pixel unit reaches brightness corresponding to the target gray scale.

The display panel driving method provided in the embodiments of the present application is applicable to a display panel including a plurality of pixel units, and a frame of scanning time of the display panel includes a plurality of sub-frames. Each of different display panels may also have a different time period of one frame of scanning time. In the embodiments of the present application, a conventional one frame of scanning time is subdivided into a plurality of sub-frames, and the time period of each of the sub-frames is 1/n of the one frame of scanning time, where N is the number of sub-frames.

Figure 2:
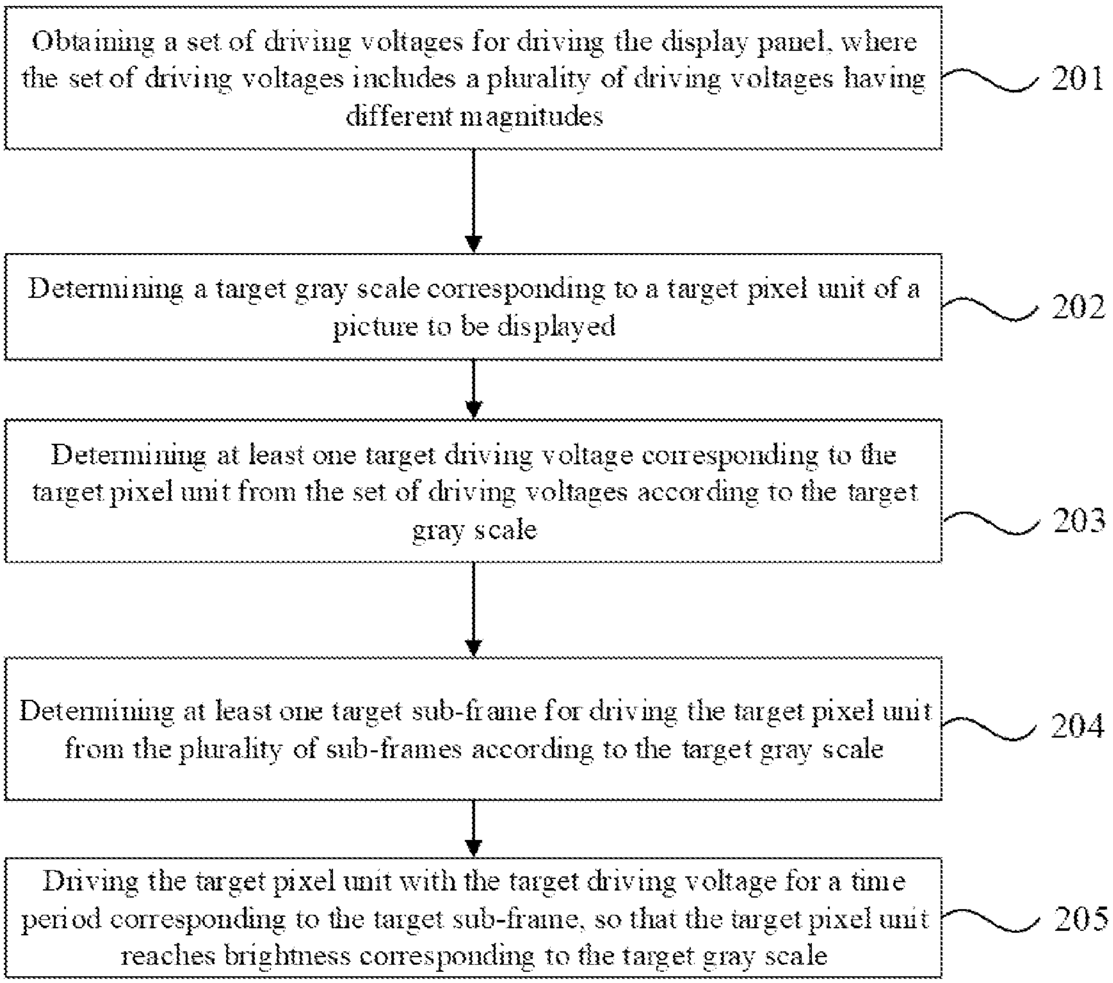
FIG. 2 is a schematic flowchart of an example of a display panel driving method according to some embodiments of the present application.

Referring to FIG. 2, which is a schematic flowchart of an example of a display panel driving method according to some embodiments of the present application. As shown in FIG. 2, the display panel driving method includes following steps 201-205.

At step 201, a set of driving voltages for driving the display panel may be obtained, where the set of driving voltages includes a plurality of driving voltages having different magnitudes.

For a driving voltage having a certain magnitude, driving signals having different magnitudes can be obtained by changing their duty cycles to drive different gray scales. For example, when the duty cycle is ⅕, the gray scale of 20 can be driven, and when the duty cycle is ⅘, the gray scale of 65 can be driven. This is also a feature of Pulse-Width Modulation (PWM) adjustment. In the embodiments of the present application, the magnitude of the driving voltage is further adjusted while changing the duty cycle of the driving voltage, so that it can drive all gray scales in a gray scale range of 0-255. A voltage level of a specific value may be used to represent a driving voltage, and voltages of different duty cycles may be also used to represent a driving voltage. One frame of scanning time described above includes a plurality of sub-frames, which actually represent different duty cycles. Driving of pixel unit in different sub-frames actually means driving of the pixel unit with driving signals of different duty cycles.

That is, the present application can implement driving of different driving signals by controlling the sub-frames for driving of the driving signals. However, if only the sub-frames of the driving signal are adjusted, it is substantially same as the conventional PWM driving. Therefore, a plurality of driving signals having different magnitudes are required to be used for driving in the embodiments of the present application. It is therefore necessary to obtain the set of driving voltages for driving the display panel, where the set of driving voltages include a plurality of driving voltages having different magnitudes.

In the present application, the driving of all gray scales in the display panel can be realized by using the driving voltages having a plurality of different magnitudes and adjusting the duty cycles of the driving voltages. In some embodiments, obtaining of the set of driving voltages may include: obtaining the number of gray scales corresponding to a gray scale level in the display panel; determining the number of sub-frames of the plurality of sub-frames; obtaining a preset initial driving voltage for driving the display panel; and determining the set of driving voltage set for driving the display panel according to the number of gray scales, the number of sub-frame number, and the initial driving voltage.

The gray scale level in the display panel refers to gray scale level that can be displayed on the display panel, such as gray scale level of 0-255, and the number of the gray scales is 255 (the gray scale of 0 is not considered herein). The present application may need to drive 255 gray scales by adjusting the magnitudes of the driving voltages and the duty cycles of the driving voltages. The duty cycles can be adjusted according to the sub-frames, and the magnitude of the driving voltage need to be determined according to the number of sub-frames.

For the embodiments of the present application, there is a preset initial driving voltage, which is related to the specification of the display panel. However, regardless of the preset initial driving voltage, it is necessary to divide the preset initial driving voltage to obtain a plurality of driving voltages having different magnitudes. Generally, the preset initial driving voltage is divided equally to obtain a driving voltage base, and different multiples of the driving voltage base is calculated to obtain a plurality of driving voltages. The number of parts in which the preset initial driving voltage is divided equally is determined according to the number of sub-frames in one frame of scanning time.

In a specific embodiment, if the number of gray scales corresponding to the gray scale level in the display panel is m and the number of sub-frames is n, then it is necessary to divide the preset initial driving voltage equally into m/n parts to obtain a driving voltage base. (1−m/n) multiples of the driving voltage base is calculated to obtain specific magnitudes of the plurality of driving voltages in the set of driving voltages.

This is because the number of gray scales corresponding to the gray scale level in the display panel actually represents the number of driving voltages in an actual driving process. For example, if there are 255 gray scales, then 255 driving voltages are required to drive the 255 gray scales respectively. For one driving voltage with certain magnitude, n sub-frames represent n different duty cycles and also represent n driving voltages with different duty cycles. Then, if the total number of driving voltages is m, n driving voltages with different duty cycles can be obtained by one driving voltage with the certain magnitude. Then, n*m/n=m driving voltages can be obtained by m/n driving voltages having different magnitudes.

For example, if 255 gray scales correspond to 255 driving voltages and one frame of scanning time corresponds to 15 sub-frames, the number of driving voltages having different magnitudes needs to be 255/15=17. In the 17 driving voltages having different magnitudes, each of the driving voltage can be used to obtain 15 driving voltages with different duty cycles. A total of 17*15=255 driving voltages can then be obtained for 17 driving voltages having different magnitudes. Assuming that the magnitude of the preset initial driving voltage is A, the 17 driving signals in the set of driving signal are A/17, 2 A/17, 3 A/17, . . . , A.

Here, the preset initial driving voltage is actually divided into a plurality of voltage levels, and the number of divided voltage levels is less than the number of 255 voltage levels in the related art. Therefore, driving is performed by using a driving voltage with a smaller level difference, so that the voltage level difference between the high gray scale and the low gray scale is reduced, and the uniformity of the picture at the low gray scale is improved.

In the above-described embodiments, it is necessary to equally dividing the preset initial driving voltage to obtain the driving voltage base number regardless of the change of the preset initial driving voltage. The number of equal parts is determined by the number of gray scales corresponding to the gray scale level and the number of sub-frames. Generally, the number of gray scales corresponding to the gray scale level has no change and is always 255. Therefore, the number of equal parts is mainly determined by the number of sub-frames. The number of sub-frames is generally equal to or greater than 2. If the number of sub-frames is equal to 1, driving can only be performed by selecting driving voltages having different magnitudes, which is the same as the driving method in the related art.

At step 202, a target gray scale corresponding to a target pixel unit of a picture to be displayed may be determined.

At step 203, at least one target driving voltage corresponding to the target pixel unit may be determined from the determined set of driving voltages according to the target gray scale.

Each of pixel units corresponds to a gray scale, and the gray scales being different also represents the driving signals corresponding to the pixel units having different magnitudes. Therefore, in the embodiments of the present application, it is first necessary to drive the target gray scale corresponding to the target pixel unit of the picture to be displayed, and then determine the magnitude of the driving signal corresponding to the target gray scale.

At step 204, at least one target sub-frame for driving the target pixel unit may be determined from the plurality of sub-frames according to the target gray scale.

At step 205, the target pixel unit may be driven with the target driving voltage for a time period corresponding to the target sub-frame, so that the target pixel unit reaches brightness corresponding to the target gray scale.

For an existing driving mode of the display panel, the magnitude of the current is usually directly changed to change the magnitude of the driving signal, or the duty cycle of the driving signal is changed to change the magnitude of the driving signal. However, two driving methods described above are combined in the present application to not only directly change the magnitude of the driving signal, but also change the magnitude of the driving signal by changing the signal duty cycle.

Specifically, a set of driving voltages including a plurality of driving voltages having different magnitudes is first obtained, and a target driving voltage corresponding to a target gray scale is further determined. Next, it is necessary to determine at least one target sub frame for driving the target pixel unit from the plurality of sub-frames, and the target pixel unit is further driven.

In the present application, one frame of scanning time is divided into a plurality of sub-frames, and each of the sub-frames represents only a period of time. The driving is not performed for the frame of scanning time. Instead, the driving is only performed for a portion of the sub-frames corresponding to each pixel unit. That is, the duty cycle of the driving signal is adjusted. Moreover, the driving voltages selected for pixel units having different gray scales in the present application are also different, that is, the magnitudes of the driving signal are directly adjusted.

The embodiments of the present application provide a display panel driving method. The display panel includes a plurality of pixel units, and a frame of scanning time of the display panel includes a plurality of sub-frames, where the method includes: obtaining a set of driving voltages for driving the display panel, where the set of driving voltages includes a plurality of driving voltages having different magnitudes; determining a target gray scale corresponding to a target pixel unit of a picture to be displayed; determining at least one target driving voltage corresponding to the target pixel unit from the set of driving voltages according to the target gray scale; determining at least one target sub-frame for driving the target pixel unit from the plurality of sub-frames according to the target gray scale; and driving the target pixel unit with the target driving voltage for a time period corresponding to the target sub-frame, so that the target pixel unit reaches brightness corresponding to the target gray scale. In the embodiments of the present application, the plurality of driving voltages having different magnitudes are used to drive different gray scales in different sub-frame, so that the difference between the driving voltages at different gray scales is reduced compared with the related art. The uniformity of the picture at the low gray scale is improved, and thus the display effect is improved.

Figure 3:
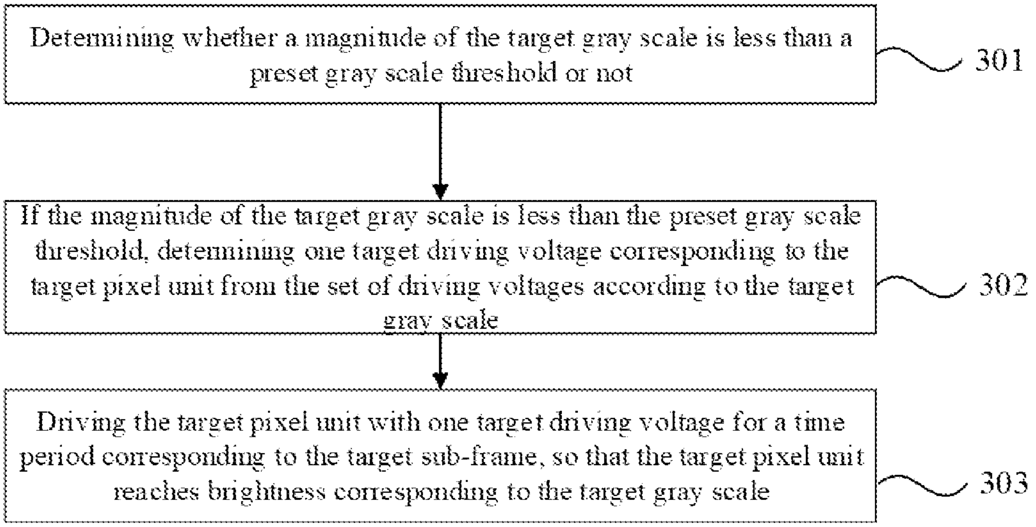
FIG. 3 is a schematic flowchart of an example of driving a target pixel unit according to some embodiments of the present application.

The display panel driving method provided in the embodiments of the present application is mainly used to improve the problem of uneven brightness of pixel units at a low gray scale, that is, applicable to the low gray scale. Therefore, the specific processing methods for the low gray scale and the high gray scale in the present application are different. As shown in FIG. 3, which is a schematic flowchart of an example of driving a target pixel unit according to some embodiments of the present application. The driving of the target pixel unit may include following steps 301-303.

At step 301, whether a magnitude of the target gray scale is less than a preset gray scale threshold or not may be determined.

At step 302, if the magnitude of the target gray scale is less than the preset gray scale threshold, one target driving voltage corresponding to the target pixel unit may be determined from the set of driving voltages according to the target gray scale.

At step 303, the target pixel unit may be driven with one target driving voltage for a time period corresponding to the target sub-frame, so that the target pixel unit reaches brightness corresponding to the target gray scale, Specifically, it is first necessary to determine whether the target gray scale of the target pixel unit is less than the preset gray scale threshold, that is, determine whether the target gray level is a low gray scale. The preset gray scale threshold may be adjusted according to actual requirements. In a particular embodiment, the preset gray level threshold may be a gray scale of 17, and other gray scales less than 17 are the low gray scale.

In the present application, for pixel units having the low gray scales, different gray scales are driven by driving voltages having different magnitudes only for a time period corresponding to one sub-frame. Since the plurality of driving voltages are included in the set of driving voltages and have the same time period cycle (i.e. only within the time period of the same sub-frame), the plurality of gray scales corresponding to the number of the plurality of driving voltages can be driven. In this way, compared with the existing driving method, the difference between the actual luminous brightness of the pixel unit at the low gray scale and the luminous brightness of the pixel unit at the high gray scale is greatly reduced. The driving current of the pixel unit at the low gray scale is increased, thereby improving uniformity of the brightness of the display panel at the low gray scale.

That one frame of scanning time includes 15 sub-frames, and 17 driving voltage having different magnitudes are included in the set of driving voltages is taken as an example. It is assumed in this case that the preset gray scale threshold is 17, that is, the gray scales lower than 17 are all low gray scales. To drive gray scales of 1-17, 17 driving voltages having different magnitudes can be selected for the time period of one sub-frame to drive the gray scales of 1-17, respectively. In the case of the high gray scales, 17 driving voltages having different magnitudes are used similarly to drive the high gray scales, except that the corresponding sub-frame when the high gray scale is driven is different from the sub-frame when the low gray scale is driven. In this way, when the low gray scales are driven, the corresponding voltage difference is within 17 levels, and when the high gray scales are driven, the corresponding voltage difference is also within the 17 levels. The voltage difference corresponding to driving high and low gray scales in the related art is within 255 levels. Therefore, the driving method provided in the embodiments of the present application can effectively reduce the voltage difference between driving of the low gray scales and driving of the high gray scales, thereby improving the uniformity of the overall picture of the display panel.

If the magnitude of the target gray scale is greater than or equal to the preset gray scale threshold, that is, the target gray scale is a high gray scale, it is then necessary to determine a plurality of target driving voltages corresponding to the target pixel unit from the set of driving voltages. Unlike the driving of the low gray scale, the driving of the high gray scale is usually performed by a plurality of driving voltages. There is, of course, also a certain sequence of driving of a plurality of driving voltages, rather than simultaneous driving of the plurality of driving voltages.

Since a plurality of target driving voltages need to be used to drive the high gray scales, the driving also needs to be performed within respective time periods corresponding to a plurality of sub-frames. Therefore, in the present application, it is necessary not only to determine a plurality of driving voltages from a set of driving voltages, but also to determine a sub-frame corresponding to each of driving voltages. In a specific driving process, it is necessary to sort the plurality of target driving voltages in a descending order to obtain the sorted target driving voltages while sequentially driving the target pixel unit with the sorted target driving voltages within a time period corresponding to the target sub-frame, so that the target pixel unit reaches brightness corresponding to the target gray level.

It should be noted that whether a low gray scale or a high gray scale is driven, the magnitude of respective driving voltage corresponding to the gray scale and the number of sub-frames corresponding to the gray scale are determined according to the gray scale.

Figure 4:
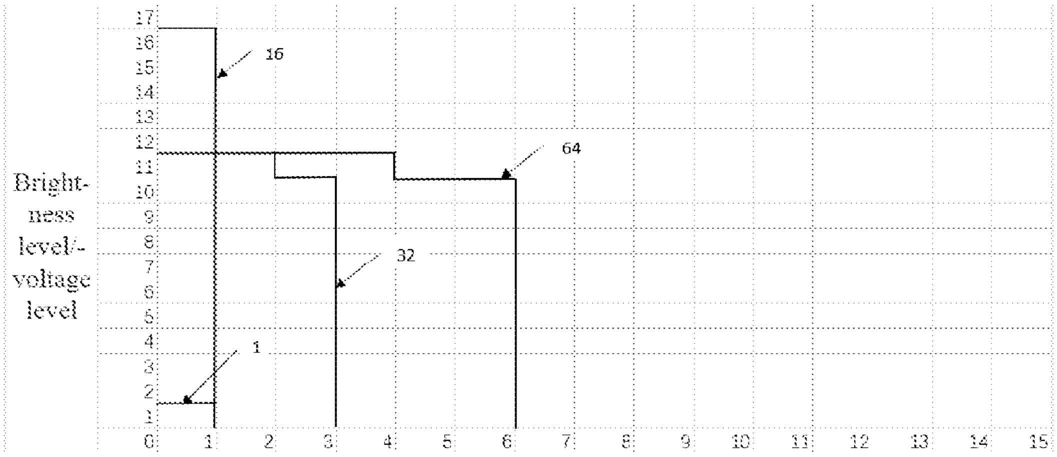
FIG. 4 is a schematic flowchart of a specific example of a display panel driving method according to some embodiments of the present application.

As shown in FIG. 4, which is a schematic flowchart of a specific example of a display panel driving method according to some embodiments of the present application. In FIG. 4, that the number of gray scales corresponding to the gray scale level is 255, one frame of scanning time includes 15 sub-frames, and 17 driving voltage are included in the set of driving voltages is taken as an example. In the embodiment shown in FIG. 4, regardless of the specific value A of the preset initial driving voltage, the preset initial driving voltage is equally divided into 17 parts, and A/17, 2A/17, 3A/17, . . . , A are used as the magnitudes of the driving voltages in the set of driving voltages, respectively. One frame of scanning time includes 15 sub-frames, that is, the display panel can be driven for 15 different time periods.

For the low gray scale of 1, the pixel unit corresponding to the gray scale of 1 may be driven with the driving voltage of A/17 in the set of driving voltages for the time period corresponding to the first sub-frame. For the low gray scale of 16, the pixel unit corresponding to the gray scale of 16 may be driven with the driving voltage of 16 A/17 in the set of driving voltages for the time period corresponding to the first sub-frame. That is, for the low gray scales, the driving voltages having different magnitudes can be directly selected from the set of driving voltages for driving of the pixel unit.

For the high gray scale of 32, the driving needs to be performed with a plurality of driving voltages for time periods corresponding to different sub-frames, respectively. Specifically, the driving may be performed with the driving voltage of 11 A/17 for the time periods corresponding to the first two sub-frames, and then with the driving voltage of 10 A/17 for the time period corresponding to the third sub-frame. Alternatively, for the high gray scale of 64, the driving may be performed with the driving voltage of 11 A/17 for the time periods corresponding to the first fourth sub-frames, and then with the driving voltage of 10 A/17 for the time period corresponding to the next two sub-frames.

When the high gray scale is driven, the magnitudes of the plurality of driving voltages corresponding to the high gray scale and the respective time period of sub-frames corresponding to each of the driving voltages may also be changed according to actual requirements. However, it is a principle that if a plurality of driving voltages are used, the plurality of driving voltages cannot be excessively different so as to ensure the uniformity of the overall picture. Generally, the driving is performed by several adjacent driving voltages. For example, the driving may be performed with a driving voltage of 10 A/17 and a driving voltage of 11 A/17, rather than the driving voltages of 4 A/17 and 10 A/17.

By taking the embodiments shown in FIG. 4 as an example, compared with the DC driving, the voltage difference between the maximum driving voltage A and the minimum driving voltage A/17 for the pixel unit is greatly reduced compared with the voltage difference between A and A/255 in the related art, so that the current in the low gray scale driving process is increased, and thus the brightness of the pixel unit at the low gray scale is increased, thereby improving the uniformity of the picture at the low gray scale. In contrast to the PWM driving, since the light is continuously emitted in the adjacent light emitting phases (i.e., the adjacent sub-frames) and the brightness of the pixel unit in the adjacent light emitting phases is substantially uniform, thereby avoiding frequent charging and discharging and increasing the time for charging. Higher brightness and higher refresh rates are further achieved.

Meanwhile, since the human eye is sensitive to the picture at the low gray scale, when the picture is driven with the display panel driving method provided in the embodiments of the present application, the uniformity of brightness can be obtained by sacrificing a portion of the resolution. For example, the brightness of each of the previously adjacent four pixel units is level1, but can be adjusted so that the brightness of one of the pixel units is level4, and the other pixel units are all in dark states. In this way, although a portion of the pixel units do not emit light and the resolution is sacrificed, the brightness of the pixel unit is increased from level1 to level4, which reduces the difference between the brightness of the pixel cell and that of other pixel units, thereby improving the uniformity of the overall picture.

Figure 5:
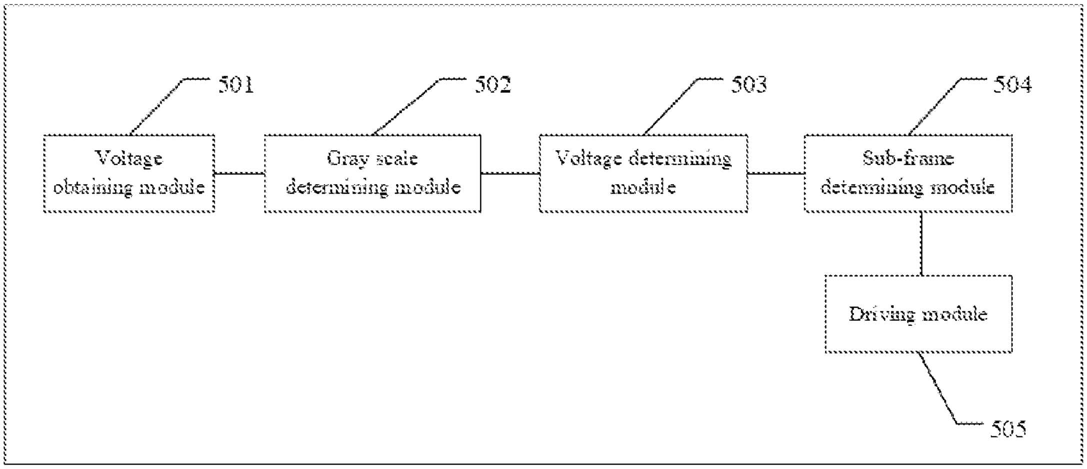
FIG. 5 is a schematic structural diagram of an example of a display panel driving apparatus according to some embodiments of the present application.

In order to better implement the display panel driving method in the embodiments of the present application, on the basis of the display panel driving method, another embodiment of the present application further provides a display panel driving apparatus. As shown in FIG. 5, which is a schematic structural diagram of an example of a display panel driving apparatus in another embodiment of the present application. The display panel driving apparatus may include: a voltage obtaining module 501 for obtaining a set of driving voltages for driving the display panel, where the set of driving voltages includes a plurality of driving voltages having different magnitudes; a gray scale determining module 502 for determining a target gray scale corresponding to a target pixel unit of a picture to be displayed; a voltage determining module 503 for determining at least one target driving voltage corresponding to the target pixel unit from the set of driving voltages according to the target gray scale; a sub-frame determining module 504 for determining at least one target sub-frame for driving the target pixel unit from the plurality of sub-frames according to the target gray scale; and a driving module 505 for driving the target pixel unit with the target driving voltage for a time period corresponding to the target sub-frame, so that the target pixel unit reaches brightness corresponding to the target gray scale.

The embodiments of the present application provides a display panel driving apparatus, which can obtain a set of driving voltages for driving the display panel, where the set of driving voltages includes a plurality of driving voltages having different magnitudes; determine a target gray scale corresponding to a target pixel unit of a picture to be displayed; determine at least one target driving voltage corresponding to the target pixel unit from the set of driving voltages according to the target gray scale; determine at least one target sub-frame for driving the target pixel unit from the plurality of sub-frames according to the target gray scale; and drive the target pixel unit with the target driving voltage for a time period corresponding to the target sub-frame, so that the target pixel unit reaches brightness corresponding to the target gray scale. In the embodiments of the present application, the plurality of driving voltages having different magnitudes are used to drive different gray scales in different sub-frame, so that the difference between the driving voltages at different gray scales is reduced compared with the related art. The uniformity of the picture at the low gray scale is improved, and thus the display effect is improved.

In some embodiments of the present application, the voltage obtaining module 501 may be configured for: obtaining the number of gray scales corresponding to a gray scale level in the display panel; determining the number of sub-frames of the plurality of sub-frames; obtaining a preset initial driving voltage for driving the display panel; and determining the set of driving voltage set for driving the display panel according to the number of gray scales, the number of sub-frame number, and the initial driving voltage.

In some embodiments of the present application, the display panel driving apparatus may further include a gray scale comparison module for determining whether the magnitude of the target gray scale is less than a preset gray scale threshold value.

In some embodiments of the present application, the voltage determining module 503 may be configured for, in response to determining that the magnitude of the target gray scale is less than the preset gray scale threshold, determining the target driving voltage corresponding to the target pixel unit from the set of driving voltages according to the target gray scale.

In some embodiments of the present application, the voltage determining module 503 may be configured for: in response to determining that the magnitude of the target gray scale is greater than or equal to the preset gray scale threshold, determining a plurality of target driving voltages corresponding to the target pixel unit from the set of driving voltages according to the target gray scale, where, the plurality of target driving voltages are a plurality of driving voltages in the set of driving voltages of which magnitudes differ by a preset range.

In some embodiments of the present application, the driving module 505 may be configured for: driving the target pixel unit with one driving voltage for a time period corresponding to the target sub-frame, so that the target pixel unit reaches brightness corresponding to the target gray scale, where, the target sub-frame includes one sub-frame.

In some embodiments of the present application, the driving module 505 may be configured for: sorting a plurality of the target driving voltages in a descending order to obtain the sorted target driving voltages; and sequentially driving the target pixel unit with the sorted target driving voltages within a time period corresponding to the target sub-frame, so that the target pixel unit reaches brightness corresponding to the target gray level; where, the target sub-frame includes a plurality of sub-frames.

Figure 6:
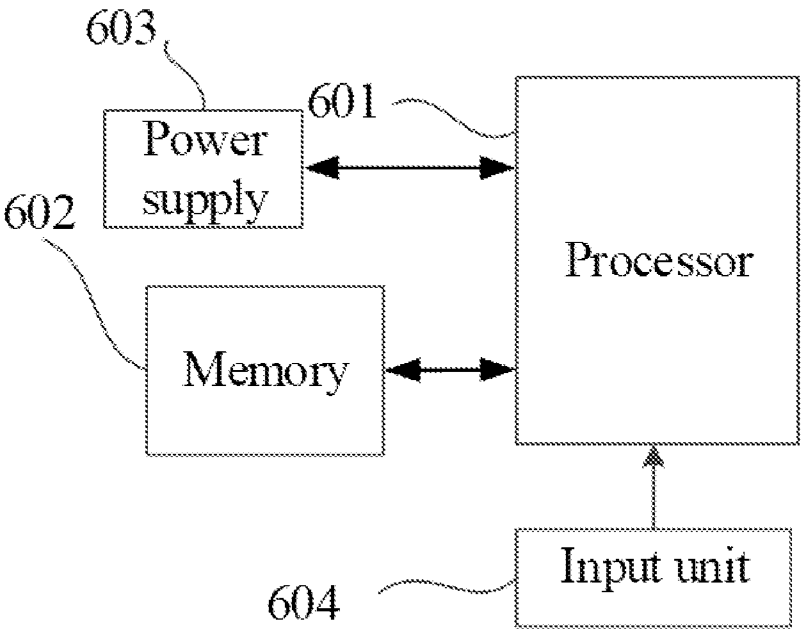
FIG. 6 is a schematic structural diagram of an example of an electronic device according to some embodiments of the present application.

Another embodiment of the present application further provides an electronic device that integrates any of the display panel driving apparatuses provided by the embodiments of the present application. As shown in FIG. 6, which shows a schematic structural diagram of the electronic device according to an embodiment of the present application.

The electronic device may include components such as a processor 601 of one or more processing cores, a memory 602 of one or more computer-readable storage media, a power supply 603, and an input unit 604. It should be understood by those skilled in the art that the structure of the electronic device shown in FIG. 5 should be not constituted to be a limitation on the electronic device, and may include more or less components than illustrated, or may combine certain components, or different component arrangements.

The processor 601 is a control center of the electronic device. The processor 601 is connected to various parts of the entire electronic device by various interfaces and lines, and performs various functions of the electronic device and processes data by running or executing software programs and/or modules stored in the memory 602 and invoking data stored in the memory 602, thereby monitoring the electronic device as a whole. Alternatively, the processor 601 may include one or more processing cores. Preferably, the processor 601 may integrate an application processor and a modem processor, where the application processor mainly processes an operating system, a user interface, an application program, and the like, and the modem processor mainly processes wireless communication. It should be understood that the modulation/demodulation processor can be independent from the processor 601.

The memory 602 may be used to store software programs and modules, and the processor 601 executes various functional applications and data processing by running the software programs and modules stored in the memory 602. The memory 602 may mainly include a storage program area and a storage data area, where the storage program area may store an operating system, an application program (such as a sound play function, an image play function, and the like) required by at least one function, and the like; and the storage data area may store data or the like created according to the use of the electronic device. In addition, memory 602 may include a high speed random access memory, and may also include a non-volatile memory, such as at least one magnetic disk storage device, a flash memory device, or other volatile solid state storage device. Accordingly, memory 602 may also include a memory controller to provide access to the memory 602 by the processor 601.

The electronic device further includes a power supply 603 for supplying power to the respective components. Preferably, the power supply 603 may be logically connected to the processor 601 by the power supply management system, so that functions such as charging, discharging, and power consumption management are managed by the power supply management system. The power supply 603 may further include one or more direct current (DC)/or alternating current (AC) power sources, recharging system, power failure detection circuit, power converter or inverter, power supply status indicator, and the like.

The electronic device may also include an input unit 604 operable to receive input numeric or character information and to generate a signal input of a keyboard, a mouse, a joystick, an optical or a trackball related to user settings and functional control.

Although not shown, the electronic device may also include a display unit or the like, of which details are not repeatedly described herein. In the present embodiment, the processor 601 in the electronic device may load executable files corresponding to processes of one or more application programs into the memory 602 according to the following instructions, and the processor 601 executes the application programs stored in the memory 602 to implement various functions including: obtaining a set of driving voltages for driving the display panel, where the set of driving voltages includes a plurality of driving voltages having different magnitudes; determining a target gray scale corresponding to a target pixel unit of a picture to be displayed; determining at least one target driving voltage corresponding to the target pixel unit from the set of driving voltages according to the target gray scale; determining at least one target sub-frame for driving the target pixel unit from the plurality of sub-frames according to the target gray scale; and driving the target pixel unit with the target driving voltage for a time period corresponding to the target sub-frame, so that the target pixel unit reaches brightness corresponding to the target gray scale.

A person of ordinary skill in the art may understand that all or some of the steps in various methods of the foregoing embodiments may be implemented by program instructions, or may be implemented by a program instructing relevant hardware. The program instructions may be stored in a computer readable storage medium, and be loaded and executed by a processor.

Yet another embodiment of the present application further provides a computer readable storage medium. The storage medium may include a Read Only Memory (ROM), a Random Access Memory (RAM), a magnetic disk, an optical disk, or the like. The storage medium stores a computer program that is loaded by a processor to perform any of the display panel driving methods provided in the embodiments of the present application. For example, the computer program may be loaded by the processor to perform the following steps: obtaining a set of driving voltages for driving the display panel, where the set of driving voltages includes a plurality of driving voltages having different magnitudes; determining a target gray scale corresponding to a target pixel unit of a picture to be displayed; determining at least one target driving voltage corresponding to the target pixel unit from the set of driving voltages according to the target gray scale; determining at least one target sub-frame for driving the target pixel unit from the plurality of sub-frames according to the target gray scale; and driving the target pixel unit with the target driving voltage for a time period corresponding to the target sub-frame, so that the target pixel unit reaches brightness corresponding to the target gray scale.

In the foregoing embodiments, descriptions of the embodiments are emphasized. A portion that is not described in detail in an embodiment may refer to related descriptions in some other embodiments above, which is not repeatedly described herein.

In the specific implementation, each of the above units or modules may be implemented as an independent entity, or may be implemented in any combination as the same entity or several entities. For the specific implementation of each of the above modules, reference may be made to the foregoing method embodiments, and details thereof are not repeatedly described herein.

Implementation of above operations may refer to above embodiments, and is not repeated herein.

The display panel driving method and apparatus, the electronic device, and the storage medium provided in the embodiments of the present application are described in detail above. A specific example is used herein to describe a principle and an implementation of the present application. The description of the foregoing embodiments is merely used to help understand a method and a core idea of the present application. In addition, an ordinary person skilled in the art may make changes in a specific implementation manner and an application scope according to an idea of the present application. In conclusion, content of this specification should not be construed as a limitation on the present application.

What is claimed is:

1. A method for driving a display panel, the display panel comprising a plurality of pixel units, and a frame of scanning time of the display panel comprising a plurality of sub-frames, wherein the method comprising:

obtaining a set of driving voltages for driving the display panel, wherein the set of driving voltages includes a plurality of driving voltages having different magnitudes;

determining a target gray scale corresponding to a target pixel unit of a picture to be displayed;

determining at least one target driving voltage corresponding to the target pixel unit from the set of driving voltages based on the target gray scale;

determining at least one target sub-frame for driving the target pixel unit from the plurality of sub-frames based on the target gray scale; and driving the target pixel unit with the target driving voltage for a time period corresponding to the target sub-frame, so that the target pixel unit reaches brightness corresponding to the target gray scale;

wherein the method further comprises: after determining of the target gray scale, determining whether a magnitude of the target gray scale is less than a preset gray scale threshold or not; and wherein the determining of the at least one target driving voltage corresponding to the target pixel unit from the set of driving voltages based on the target gray scale comprises:

in response to determining that the magnitude of the target gray scale is less than the preset gray scale threshold, determining one target driving voltage corresponding to the target pixel unit from the set of driving voltages based on the target gray scale.

2. The method of claim 1, wherein the obtaining of the set of driving voltages further comprising:

obtaining the number of gray scales corresponding to a gray scale level in the display panel;

determining the number of sub-frames of the plurality of sub-frames;

obtaining a preset initial driving voltage for driving the display panel; and determining the set of driving voltage set for driving the display panel based on the number of gray scales, the number of sub-frame number, and the preset initial driving voltage.

3. The method of claim 1, wherein the driving of the target pixel unit comprises:

driving the target pixel unit with one target driving voltage for a time period corresponding to the target sub-frame, so that the target pixel unit reaches brightness corresponding to the target gray scale, wherein, the target sub-frame includes one sub-frame.

4. The method of claim 1, wherein the determining of the at least one target driving voltage corresponding to the target pixel unit from the set of driving voltages based on the target gray scale further comprises:

in response to determining that the magnitude of the target gray scale is greater than or equal to the preset gray scale threshold, determining a plurality of target driving voltages corresponding to the target pixel unit from the set of driving voltages based on the target gray scale, wherein, the plurality of target driving voltages are a plurality of driving voltages in the set of driving voltages of which magnitudes differ by a preset range.

5. The method of claim 4, wherein the driving of the target pixel unit comprises:

sorting the plurality of target driving voltages in a descending order to obtain the sorted target driving voltages; and sequentially driving the target pixel unit with the sorted target driving voltages for a time period corresponding to the target sub-frame, so that the target pixel unit reaches brightness corresponding to the target gray level;

wherein, the target sub-frame includes a plurality of sub-frames.

6. An electronic device, comprising:

one or more processors;

a memory; and one or more application programs, where the one or more application programs are stored in the memory and configured to be executed by the processors to implement a method for driving a display panel, the display panel comprising a plurality of pixel units, and a frame of scanning time of the display panel comprising a plurality of sub-frames, wherein the method comprising:

obtaining a set of driving voltages for driving the display panel, wherein the set of driving voltages includes a plurality of driving voltages having different magnitudes;

determining a target gray scale corresponding to a target pixel unit of a picture to be displayed;

determining at least one target driving voltage corresponding to the target pixel unit from the set of driving voltages based on the target gray scale;

determining at least one target sub-frame for driving the target pixel unit from the plurality of sub-frames based on the target gray scale; and driving the target pixel unit with the target driving voltage for a time period corresponding to the target sub-frame, so that the target pixel unit reaches brightness corresponding to the target gray scale;

wherein the method further comprises: after determining of the target gray scale, determining whether a magnitude of the target gray scale is less than a preset gray scale threshold or not; and wherein the determining of the at least one target driving voltage corresponding to the target pixel unit from the set of driving voltages based on the target gray scale comprises:

in response to determining that the magnitude of the target gray scale is less than the preset gray scale threshold, determining one target driving voltage corresponding to the target pixel unit from the set of driving voltages based on the target gray scale.

7. The electronic device of claim 6, wherein the obtaining of the set of driving voltages further comprising:

obtaining the number of gray scales corresponding to a gray scale level in the display panel;

determining the number of sub-frames of the plurality of sub-frames;

obtaining a preset initial driving voltage for driving the display panel; and determining the set of driving voltage set for driving the display panel based on the number of gray scales, the number of sub-frame number, and the preset initial driving voltage.

8. The electronic device of claim 6, wherein the driving of the target pixel unit comprises:

driving the target pixel unit with one target driving voltage for a time period corresponding to the target sub-frame, so that the target pixel unit reaches brightness corresponding to the target gray scale, wherein, the target sub-frame includes one sub-frame.

9. The electronic device of claim 6, wherein the determining of the at least one target driving voltage corresponding to the target pixel unit from the set of driving voltages based on the target gray scale further comprises:

in response to determining that the magnitude of the target gray scale is greater than or equal to the preset gray scale threshold, determining a plurality of target driving voltages corresponding to the target pixel unit from the set of driving voltages based on the target gray scale, wherein, the plurality of target driving voltages are a plurality of driving voltages in the set of driving voltages of which magnitudes differ by a preset range.

10. The electronic device of claim 9, wherein the driving of the target pixel unit comprises:

sorting the plurality of target driving voltages in a descending order to obtain the sorted target driving voltages; and sequentially driving the target pixel unit with the sorted target driving voltages for a time period corresponding to the target sub-frame, so that the target pixel unit reaches brightness corresponding to the target gray level;

wherein, the target sub-frame includes a plurality of sub-frames.

11. A computer readable storage medium having stored thereon a computer program that is loaded by a processor to perform a method for driving a display panel, the display panel comprising a plurality of pixel units, and a frame of scanning time of the display panel comprising a plurality of sub-frames, wherein the method comprising:

obtaining a set of driving voltages for driving the display panel, wherein the set of driving voltages includes a plurality of driving voltages having different magnitudes;

determining a target gray scale corresponding to a target pixel unit of a picture to be displayed;

determining at least one target driving voltage corresponding to the target pixel unit from the set of driving voltages based on the target gray scale;

determining at least one target sub-frame for driving the target pixel unit from the plurality of sub-frames based on the target gray scale; and driving the target pixel unit with the target driving voltage for a time period corresponding to the target sub-frame, so that the target pixel unit reaches brightness corresponding to the target gray scale;

wherein the method further comprises: after determining of the target gray scale, determining whether a magnitude of the target gray scale is less than a preset gray scale threshold or not; and wherein the determining of the at least one target driving voltage corresponding to the target pixel unit from the set of driving voltages based on the target gray scale comprises:

in response to determining that the magnitude of the target gray scale is less than the preset gray scale threshold, determining one target driving voltage corresponding to the target pixel unit from the set of driving voltages based on the target gray scale.

12. The computer readable storage medium of claim 11, wherein the obtaining of the set of driving voltages further comprising:

obtaining the number of gray scales corresponding to a gray scale level in the display panel;

determining the number of sub-frames of the plurality of sub-frames;

obtaining a preset initial driving voltage for driving the display panel; and determining the set of driving voltage set for driving the display panel based on the number of gray scales, the number of sub-frame number, and the preset initial driving voltage.

13. The computer readable storage medium of claim 11, wherein the driving of the target pixel unit comprises:

driving the target pixel unit with one target driving voltage for a time period corresponding to the target sub-frame, so that the target pixel unit reaches brightness corresponding to the target gray scale, wherein, the target sub-frame includes one sub-frame.

14. The computer readable storage medium of claim 11, wherein the determining of the at least one target driving voltage corresponding to the target pixel unit from the set of driving voltages based on the target gray scale further comprises:

in response to determining that the magnitude of the target gray scale is greater than or equal to the preset gray scale threshold, determining a plurality of target driving voltages corresponding to the target pixel unit from the set of driving voltages based on the target gray scale, wherein, the plurality of target driving voltages are a plurality of driving voltages in the set of driving voltages of which magnitudes differ by a preset range.

* * * * *